Aug. 23, 1960   M. G. STEWART   2,949,854
POWER GAS GENERATING CARTRIDGES FOR
THE ACTUATION OF ENGINE STARTERS
Filed Dec. 27, 1957   2 Sheets-Sheet 1

INVENTOR
MALCOLM GORDON STEWART

BY Cushman, Darby & Cushman
ATTORNEYS

Aug. 23, 1960

M. G. STEWART 2,949,854

POWER GAS GENERATING CARTRIDGES FOR
THE ACTUATION OF ENGINE STARTERS

Filed Dec. 27, 1957

INVENTOR
MACOLM GORDON STEWART

BY Cushman, Darby & Cushman
ATTORNEYS

United States Patent Office 2,949,854
Patented Aug. 23, 1960

2,949,854

POWER GAS GENERATING CARTRIDGES FOR THE ACTUATION OF ENGINE STARTERS

Malcolm Gordon Stewart, Fairlie, Scotland, assignor to Imperial Chemical Industries Limited, London, England, a corporation of Great Britain Filed Dec. 27, 1957, Ser. No. 705,588

Claims priority, application Great Britain Dec. 31, 1956

2 Claims. (Cl. 102—39)

This invention relates to improved power gas generating cartridges for the actuation of engine starters of the kind in which the gases are required to impinge on the blades of a turbine and is particularly applicable to aircraft engines.

Many modern aircraft starters necessitate the employment of a starter cartridge; such cartridges contain a charge of a substantially ashless combustible composition such as a nitrocellulose-nitroglycerine composition, with suitable cooling and stabilising ingredients and ignition means therefor. The propellant charge in the starter cartridge is usually designed to burn at a higher pressure than the working pressure of the turbine, and this is achieved by interposing a pressure-controlling nozzle between the cartridge breech and the turbine chamber. It is important that the cartridge should be so designed that this nozzle does not become obstructed during the burning of the charge. Furthermore, the cartridge must withstand the great vibration to which it is subjected when carried on an aircraft, since it is generally necessary to mount unused cartridges on the engine itself. It should nevertheless be capable of functioning with complete reliability when required, particularly in the case of fighter aircraft where speed of take off is a vital consideration. The elimination of any factor which may adversely affect the positive functioning of the cartridge when required for use is therefore of great importance. It is usual in cartridges of this type to provide in a rigid closure an element which is readily removed by disruption and/or burning to permit the escape of the gases from the cartridge when it is fired. This material must be of such composition, and so mounted in the closure, that it provides a waterproof seal, and of such a nature that it will not cause an obstruction or damage the starter components through which fragments of it may be ejected on disruption. Cellulose acetate has been used for this purpose but it is obvious that other materials would be suitable, having regard to the properties required.

In starter cartridges of the construction heretofore used, it has been found that the waterproof closure is sometimes damaged during manufacture or subsequent handling, thereby facilitating the entry of moisture and consequent spoilage of the cartridge. Furthermore, the design of such cartridges has been such that the mouth of the closed cartridge has not always remained truly circular in form, with the result that the cartridge may not obturate efficiently, thereby permitting gas to penetrate between the side of the cartridge case and the breech even to the firing mechanism which may thus become fouled by deposits.

In accordance with the present invention, an engine starting cartridge having a charge of combustible material, ignition means therefor, means to retain the solid combustible products within the cartridge with only small movement, and a disruptible waterproof closure member, is characterised in that the closure member comprises a skirted rigid closure of slightly smaller external diameter than the internal diameter of the cartridge mouth, so that the skirt of the closure will fit snugly therein, a disruptible waterproof material forming part of the closure lid and adhered to the inner rigid surface portion of the lid, and a spacer member of particular construction as hereinafter shown seated within the closure. The spacer member is designed to prevent forward movement of the propellant charge which would hinder free passage of the gases from the breech. The closure lid may be provided on its skirted edge with a series of dimples which help to retain the charge against excessive movement.

Figure 1:
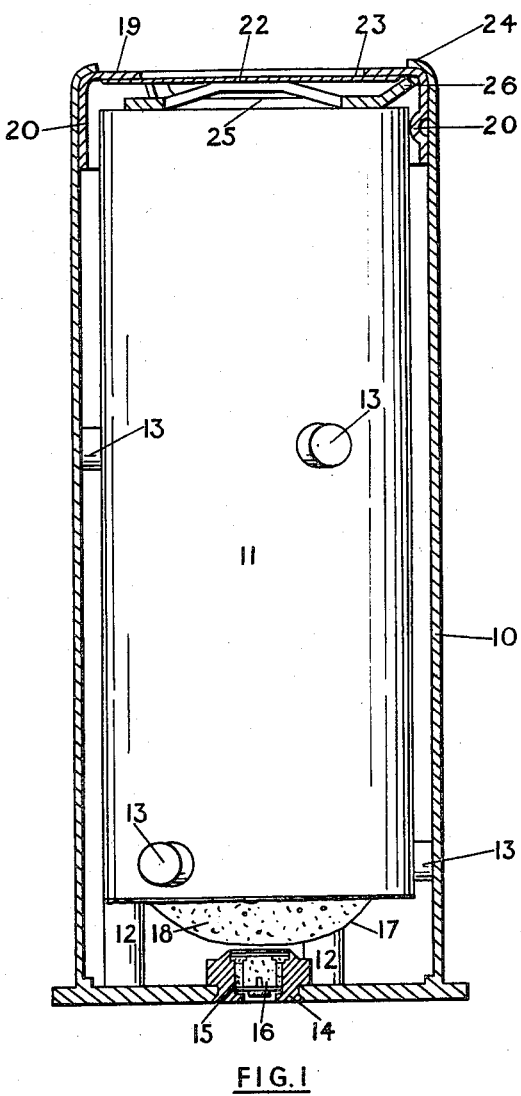
Figure 1 illustrates the engine starting cartridge partly in section.
Figure 2:
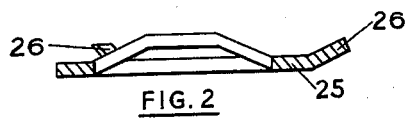
Figures 2 and 3 are detailed views of the spacer member.
Figure 3:
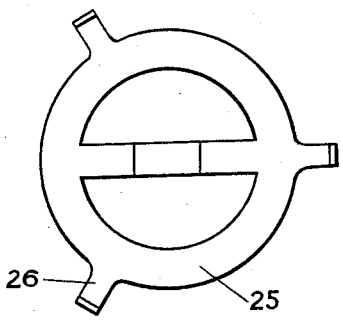
Figure 4:
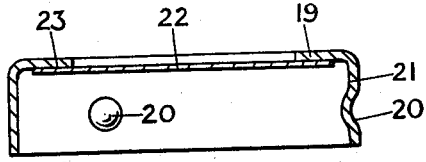
Figures 4 and 5 are detailed views of the closure member.
Figure 5:
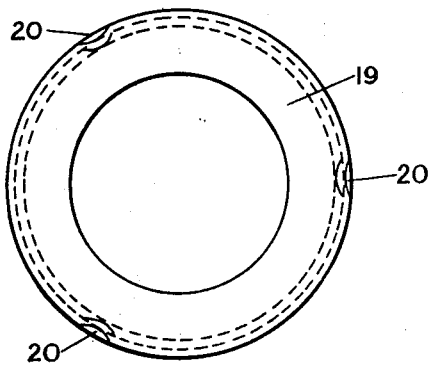

Referring to Figure 1 of the drawings, 10 is a cartridge case, conventionally made of brass, 11 is a charge of combustible material, for example a nitrocellulose-nitroglycerine material provided with legs 12, and studs 13, which may be of the same or of a modified composition. Pressed into the base of the cartridge case 10 is an igniter housing 14, containing an igniter 15 charged with an igniting composition 16, for example, fine grained blackpowder, and above it a thin walled bag 17, containing a charge of igniting composition 18, for example coarse grained blackpowder. The cartridge case 10 is provided with a rigid skirted closure 19 having dimples 20 on its skirt 21 and a disruptible portion 22, of a suitable waterproof material, adhered to the under surface of the closure 19 at 23. The cartridge case 10, which is slightly tapered from the base to ensure a close fit within the breech of the firing device, is turned over at 24 to engage and hold the closure member 19. An adhesive composition may be run around the engaging surface of the case and cover. Between the charge of combustible material 11 and the closure 19 is located a spacer member 25 provided with legs 26, which serves to limit the forward movement of the charge so that free escape of gas from the cartridge is not prevented. Figures 2 and 3 are detailed views of the spacer member 25, and Figures 4 and 5 are detailed views of the closure member 19.

The charge of combustible material 11 is retained within the cartridge case 10 with restricted movement by means of the legs 12, studs 13, dimples 20 and spacer 25. The legs 26 of the spacer 25 bear against the underside of the closure 19, and preferably at the turn of the flange 21 and beyond the disruptible portion 22. It will thus be seen that the waterproof portion 22 is given considerable protection against damage in construction, transport and storage, in that none of the combination of parts forming the assembly bears directly upon it or only to a very limited degree. The employment of the rigid skirted closure member 19 as an element in the closure of the cartridge imparts a further substantial advantage into the assembly, since its skirted side 21 provides a rigid support for the top of the cartridge case 10 which retains the circular configuration of the latter. Previous designs of power gas generating cartridges of this type have not provided this positive method of retaining the circular shape with the result that the cartridge has not always obturated, and may indeed prove difficult to insert into the breech.

The closure, the subject of the present invention, provides a more durable atmospheric seal than that of cartridges previously used whereby the ingress of moisture which may cause a cartridge to misfire is minimised, and in addition, reduces the liability of failure of the cartridge to obturate.

What I claim is:

1. An engine starting cartridge case of generally circular cross-sectional configuration having an open and a closed end; a solid charge of gas producing combustible material disposed in said case; ignition means for said charge; means to retain said charge within said case with only small movement therein, said means comprising a disruptible waterproof closure positioned within the open end of said case and including a rigid member having an annularly continuous skirt portion extending toward the closed end of said case and of slightly smaller diameter than the internal diameter of said case, and said skirt portion being in engagement with the interior thereof, said member having a disruptible medial portion comprising an element of waterproof material adhered to its underside; a spacer member resting on said charge and having legs on its periphery directed toward the open end of said case and abutting the rigid portion of said closure member radially outwardly of said element; and the open end of said case being turned inwardly to form a rim about said closure member.

2. An engine starting cartridge as claimed in claim 1 wherein the skirted portion of the rigid closure member is provided with a series of dimples to space said charge in said casing.

References Cited in the file of this patent

UNITED STATES PATENTS 2,688,920    Jarvis  ---------------- Sept. 14, 1954

FOREIGN PATENTS 955,187    France  ---------------- June 27, 1949